United States Patent [19]

Lamarche et al.

[11] 4,418,855

[45] Dec. 6, 1983

[54] TOOL UNIT FOR COLLECTIVE BREAKING OF OPTICAL FIBRES

[75] Inventors: Dominique Lamarche; Marie C. Soster, both of Suresnes, France

[73] Assignee: SOCAPEX, Suresnes, France

[21] Appl. No.: 287,945

[22] Filed: Jul. 29, 1981

[30] Foreign Application Priority Data

Jul. 31, 1980 [FR] France .................... 80 16917

[51] Int. Cl.³ ............................................. C03B 37/16
[52] U.S. Cl. ........................................ 225/96; 225/2; 225/96.5
[58] Field of Search ................ 225/2, 96.5, 101, 96; 65/10.2; 81/9.51

[56] References Cited

U.S. PATENT DOCUMENTS

| 4,017,013 | 4/1977 | Hawk et al. | 225/96.5 |
| 4,046,298 | 9/1977 | Schroeder et al. | 225/96.5 X |
| 4,168,026 | 9/1979 | Lukas et al. | 225/96.5 |
| 4,257,546 | 3/1981 | Benasutti | 225/96.5 |
| 4,315,584 | 2/1982 | Wuestner | 225/96.5 X |

*Primary Examiner*—Frank T. Yost
*Attorney, Agent, or Firm*—Cushman, Darby & Cushman

[57] ABSTRACT

The end faces of a plurality of parallel optical fibers are all located in one plane at right angles to the general direction of the fibers after simultaneous cutting by a tool unit comprising a sliding shoe which carries a cutting-tool support. During translational displacement of the shoe, the cutting edge of the tool scores each optical fiber in turn. A flat, parallel array of fibers is stretched tangentially to the top generator-line of a bearing cylinder and held in position between two clamping members on each side of the bearing line. At the level of the notch formed in the glass fiber by scoring, each optical fiber is split in transverse cross-section by applying an abrupt tensile stress or flexural deformation to the fiber.

12 Claims, 6 Drawing Figures

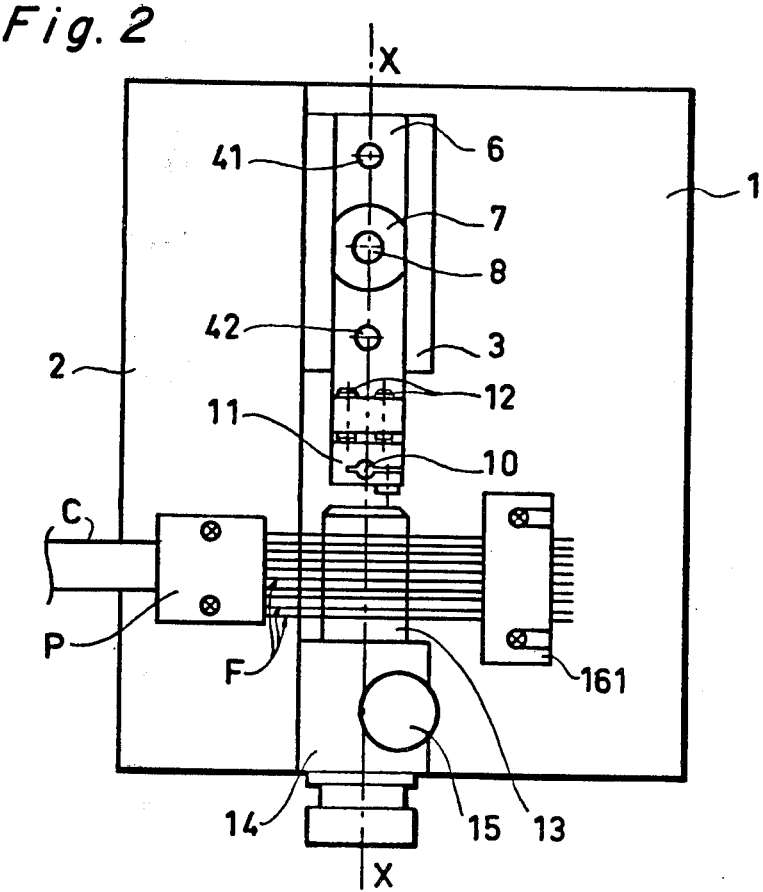
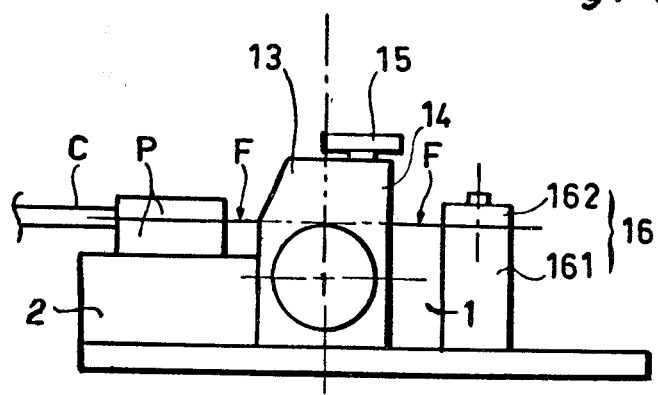

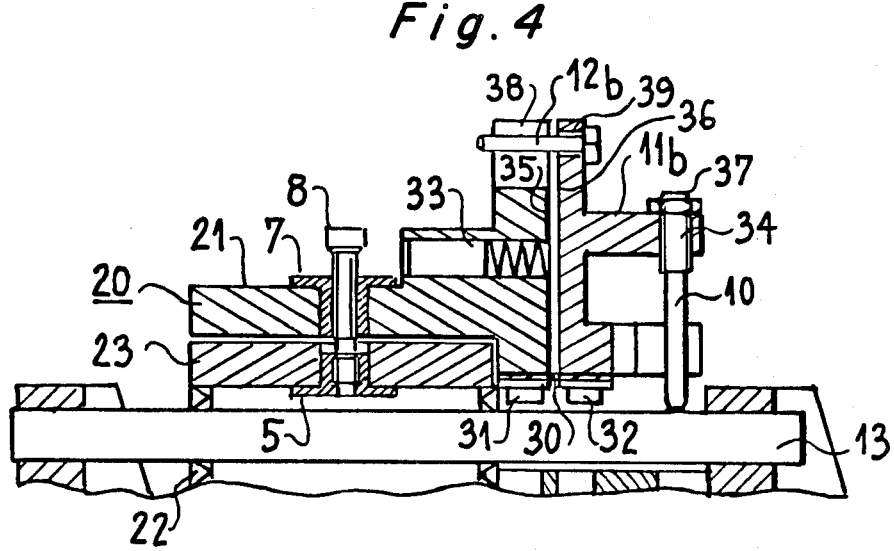
Fig. 4
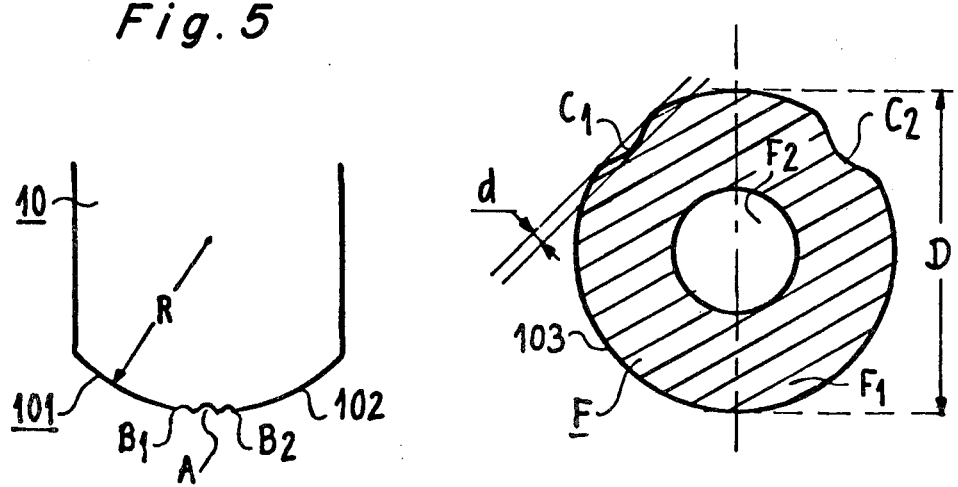
Fig. 5
Fig. 6

TOOL UNIT FOR COLLECTIVE BREAKING OF OPTICAL FIBRES

This invention relates to a tool unit for simultaneous shearing of a number of optical fibers so as to form optical faces of sufficiently high quality to permit direct use of the cut fibers in a multifiber optical cable splice.

It is in fact known that, in order to "splice" two optical cables containing a number of fibers, an excellent solution, although difficult to apply in practice, consists in cutting the fibers along flat sections which are as perfect as possible, thereby permitting fiber-to-fiber welding of cable ends without any need to retouch the lengths of the fibers.

One known method for single fibers surrounded by cladding of small thickness consists in forming an incipient cleavage fracture, first by scoring the fiber with a cutting tool having high hardness such as a diamond which penetrates through the cladding to the glass, then in breaking the fiber by applying an abrupt mechanical stress.

Tools for carrying out this method are already known but are designed for separate operation on each individual fiber. The disadvantages attached to tools of this type are the following:

(a) the operation is tedious in the case of a cable containing a large number of fibers;

(b) the flat sections of the fiber lengths are not aligned, with the result that splicing is not possible without recutting the fibers.

The invention provides a remedy for these disadvantages by disposing the fibers in parallel relation in a plane tangent to a bearing cylinder and by scoring all the fibers at aligned points. This operation takes place during one and the same movement of translation of a cutting-tool which is adjusted for height with extreme precision.

The tool unit according to the invention is of the type comprising first means defining a reference plane and a direction of translational motion parallel to the reference plane, second means defining a straight bearing line for supporting the optical fibers at the apex of a convex surface, the straight bearing line being parallel to the direction of translational motion, third means for placing a cutting-tool above the reference plane while permitting a movement of translation of said tool along a straight line parallel to the bearing line so that the cutting portion of the tool is consequently capable of scoring the entire fiber which is located on the straight bearing line.

The invention is distinguished by the fact that the first means are constituted by a platform rigidly fixed to a translational-motion guide strip having one face parallel to said translational-motion line; that the second means comprise at least one device for clamping fibers in a plane containing the bearing line; and that the third means comprise a cutting-tool support having one face which is intended to rest on the platform and one face which is intended to slide along the guide strip, and fine adjustment means for establishing the optimum height of the cutting-tool above the reference plane.

In a preferential embodiment, the cutting edge of the tool has a radius of curvature within the range of 1 mm to 30 mm in a plane perpendicular to the axis of the fibers. When the cutting tool is placed on the unit according to the invention, said cutting edge scores the fiber section tangentially.

The curved shape of the cutting edge has the effect of reducing wear of the cutting tool. The tool is in fact eroded in a very short time since the surface of the cutting tool becomes dented, thus resulting in disintegration of its cutting edge. In consequence, the quality of the notch is impaired and it proves necessary to change the cutting tool. Said curved shape has a twofold purpose, namely that of providing a better tooledge angle for cutting fibers and that of providing a large number of points which are capable of scoring the fiber. In fact, progressively as wear develops on the edge of the cutting tool, the tip of the fiber-cutting edge is displaced along the curved portion and is thus renewed.

The rounded shape of said cutting edge is more particularly suited to the case in which the cutting tool follows the circumference of the section of the optical fiber. In fact, this rounded shape offers favorable conditions for cutting the fiber with one point of the cutting edge, then displacing the cutting tool around the circumference of the fiber, and finally cutting the fiber with another point of the cutting edge which is symmetrical with the first point with respect to the apex of the rounded portion of the cutting edge. Scoring of the fiber is therefore carried out by two points of the rounded edge.

In a preferential embodiment, the tool unit according to the invention comprises a spring device for connecting a split block which supports the cutting tool to the body of the support block. The spring device under consideration usually consists of a flexible strip placed between the split cutting-tool support block and the body of said block. An elastic movement is thus introduced by said device between the body of the support which is rigidly fixed and the cutting tool. The aim of the device is to maintain a constant pressure of the cutting tool on the fiber whereas the cutting tool has different vertical positions.

Adjustment of the pressure has a direct influence on the quality of cut of the fiber and it is important to have a constant pressure while maintaining a range of tolerance for the other parameters. In fact, when the cutting tool comes into contact with the optical fiber, it produces an impact on the fiber and this latter is thus scored. The impact then propagates mechanically through the fiber in concentric zones around the point of impact, thus modifying the structure of the fiber which facilitates breaking of this latter along a section plane at right angles to the axis of the fiber. If the impact is too violent, it results in the formation of secondary marks which are liable to reach the core of the fiber which is then no longer homogeneous and light propagation along the fiber is disturbed. In order to form a correct notch by scoring, it is necessary to ensure that secondary marks are not formed. It should also be pointed out that, if the notch is of excessive depth, secondary marks will similarly reach the fiber core.

The spring device of the flexible strip type for maintaining a constant pressure in respect of different vertical positions of the cutting tool permits vertical tool displacement during the operation which consists in scoring all the fibers of a given cable. In other words, it is possible to adjust the tool unit for the entire scoring operation despite the fact that the diameter of the fibers varies and to score these latter by displacing the cutting-tool over part of the circumference of the fiber section.

Depending on the intended use of the tool unit according to the invention, the pressures applied on the fiber vary between a few grams and 400 grams.

In the case of high pressures within the range of 50 g to 500 g, the spring device compensates for variations in diameter of the fibers. In order to apply these pressures, a compressed spring is placed between the split block and the body of the tool support. The notch is formed on the top face of the optical fiber.

In the case of lower pressures, the spring device makes it possible for the cutting tool to follow the circumference of the optical fiber. In this case, the point of impact of the cutting tool does not need to be localized with precision and initial adjustment of the height of the fiber allows a certain degree of tolerance since a variation in height of 30 $\mu$m or 40 $\mu$m is permissible in the case of fibers having a mean diameter of 125 $\mu$m. In fact, the flexible strip maintains a constant pressure over a broader range of variation in height but the conditions of horizontal position-maintenance of the fiber make it necessary to ensure that initial cutting does not take place at a level of the fiber section which is too low.

The optical fiber is maintained horizontally by means of a groove cut on the straight bearing line which supports the fibers.

The split block of the tool unit according to the invention preferentially comprises a cylindrical bore in which the cutting-tool is capable of moving. The pressure exerted on the fiber then results solely from the weight of the cutting tool. This pressure is of low value and is within the range of 3 g to 10 g. The cutting tool follows the contour of the circumference of the optical fiber under the action of the resultant between its weight and the reaction of the fiber. The weight is so determined as to score the fiber to a depth of less than 5 $\mu$m. For the same reasons as those given earlier, the height adjustment has a tolerance of up to 40 $\mu$m.

Other features of the invention will be more apparent to those skilled in the art upon consideration of the following description and accompanying drawings in which:

FIGS. 2 and 3 are top views in elevation showing the same embodiment;

FIG. 4 is a longitudinal sectional view of another exemplified embodiment of the invention;

FIG. 5 is a profile view of one embodiment of the cutting portion of the cutting tool;

FIG. 6 is a sectional view of a scored optical fiber.

Figure 1:
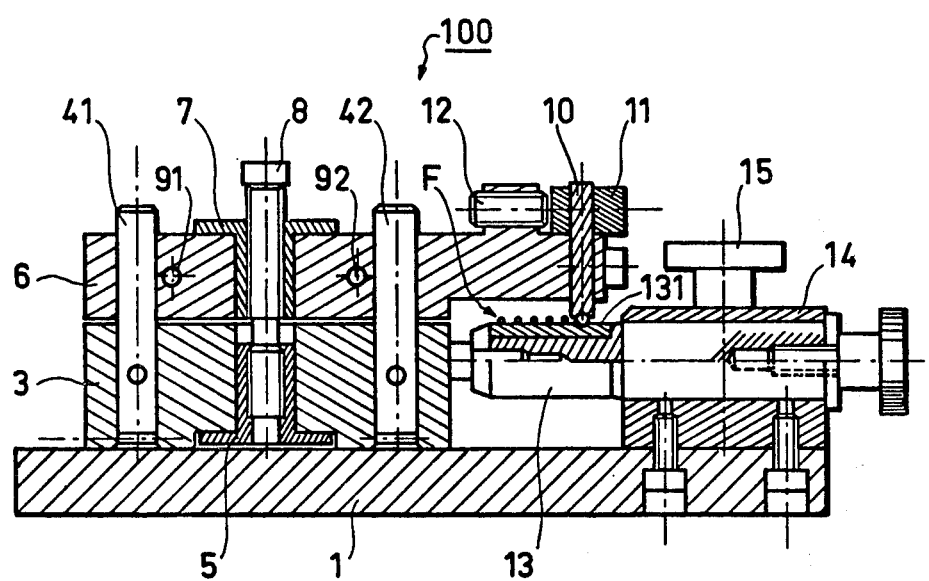
FIG. 1 is a longitudinal sectional view of one embodiment of the invention.

A reference plane is defined by a platform 1 which constitutes a base for the means for clamping and supporting optical fibers designated in each figure by the reference F.

The same platform serves as a sliding surface for the shoe 3 on which is mounted the support 6 proper for the cutting tool 10. The movement of translation of the shoe 3 is guided by a guide strip 2 and one straight edge of the shoe 3 is adapted to slide against the edge of said guide strip as shown in FIG. 2.

The means for clamping and supporting optical fibers comprise in the first place a preparation member P into which an optical cable C penetrates entirely and passes out after stripping of the sheath and cable core (central strength member) which have been selected so that only optical fibers are permitted to project beyond the preparation member P in an accurately positioned and flat array. The fibers which pass out of the member P bear on a straight line 131 (as shown in FIG. 1) which is parallel to the reference plane and is a generator-line of a cylinder of revolution 13 mounted on a split support 14 which is tightened by means of a screw 15. Finally, a vise 16 clamps the fibers at a point beyond the bearing line and between two jaws 161 and 162, with the result that the fibers are maintained under a predetermined tension.

The means for supporting and fine adjustment of the cutting tool are designed as follows. In a plane of symmetry represented by the line X—X in FIG. 2, the shoe 3 has two parallel columns 41 and 42 which emerge from the shoe, penetrate into the support 6 and are intended to guide said support during vertical displacements to which it is subjected by the fine adjustment. In addition, the shoe 3 and the support 6 are fitted with two sleeves 5 and 7 located on the same axis at right angles to the reference plane, said sleeves being provided with internal screw-threads of slightly different pitch. A single screw 8 or so-called "differential" screw provided with two threaded portions having the respective pitches of the sleeves 5 and 7 is mounted within said sleeves. Finally, tangent plugs 91 and 92 bear on the columns 41 and 42 in order to lock the support 6 in position.

The cutting-tool 10 is clamped within a split block 11. Adjusting screws 12 located on each side of the plane represented by the line X—X serve to vary the orientation of the cutting edge of the tool 10.

The method adopted for the use of the tool unit will now be explained. When the fibers have been mounted in the manner described earlier, the cutting-tool is displaced by sliding the shoe 3 on the base 1 against the guide strip 2 in such a manner as to ensure that the cutting edge of the tool scores the fibers as lightly as possible while penetrating to the glass core. Once the scoring operation has been completed and a groove has thus been formed, the fibers are broken either under tensile stress or abrupt flexural deformation. The cutting-tool is then returned to a position in which the cylinder 13 is entirely freed. A further operation is then possible with a fresh cable.

The differential screw makes it possible to adjust the depth of the notch to within a few microns when the difference in pitch of the internal screw-threads 5 and 7 is sufficiently small.

FIG. 4 is a longitudinal sectional view of another exemplified embodiment of the invention. In this figure, the same elements as those of FIG. 1 are designated by the same references. The means for clamping and supporting the optical fibers are the same as those of FIGS. 1, 2 and 3. FIG. 4 only shows the cylinder of revolution 13 which is maintained in the horizontal position.

The cutting-tool support is designed in three parts. The first part is constituted by a shoe 23 which is capable of displacement in a direction parallel to the axis of the cylinder of revolution and which is fixed on this latter by means of a hollow, circular member 22 rigidly fixed to the shoe 23. The second part 21 is attached to the shoe 23 by means of a so-called differential screw 8 and is capable of vertical displacement with respect to the shoe 23 by means of the differential screw 8. The screw 8 has two threaded portions having the respective pitches of the sleeves 5 and 7 and is mounted within these latter. The shoe 23 and the second part 21 constitute the body 20 of the cutting-tool support. The third part is the split block 11b which carries the cutting-tool.

The second part includes a vertical wall 35 against which is placed the vertical wall 36 corresponding to the wall 35 in the case of the split block 11b. The flexible strip 30 is a flat rectangular member which is placed in position beneath the vertical walls 35 and 36 by means of two screws 31 and 32, thus supporting the split block 11b. Said block is also attached to the second part 21 of the body 20 by means of an adjusting screw 12b which is engaged in two horizontal threaded portions 38 and 39 respectively of the second part 21 and of the split block 11b. These two threaded portions 38 and 39 are located opposite to each other and formed in the top portions of the two walls 35 and 36. A compressed spring 33 is applied against the second part 21, exerts a thrust on the wall 36 of the split block 11b and thus maintains a pressure on this latter. Said block 11b is also provided with a vertical cylindrical bore 34 within which the cutting tool is secured by means of the member 37.

When the adjusting screw 12b is fully engaged in the threaded portions 38 and 39, the cutting-tool is moved upwards. By progressively unscrewing said screw 12b, the cutting-tool is lowered to the desired height. The shoe 23 then carries out a displacement along the cylinder 13 until it comes into contact with the first fiber to be scored. As a result of correct balancing of the block 11b which is achieved by means of the flexible strip, the cutting-tool scores the optical fiber along its circumference 103. The notch or groove thus obtained has a depth of approximately 5 $\mu$m. The shoe 23 then continues to travel in the horizontal direction and the other fibers F of the cable to be spliced are accordingly scored in the same manner. In a single movement of the cutting-tool support and more especially of the shoe 23, all the fibers of the same cable are thus scored. It should be noted that, once the tool unit has been correctly adjusted, a number of cables may be scored and replaced in succession on the tool unit according to the invention.

FIG. 5 is a profile view of one design of the cutting portion of the cutting-tool 10. Said cutting portion has the shape of a convex curve having radii of curvature R within the range of 1 mm to 30 mm, thus forming a rounded portion 101. The rounded portion 101 therefore has an apex A and rounded slopes on each side of said apex A. When the cutting-tool is positioned on the unit according to the invention, the apex A is directed downwards and two rounded lines 102 are placed in the same plane as the plane of section of the fibers to be scored and in the direction of displacement of the shoe. In the case illustrated, the apex A has dents resulting from successive scoring of optical fibers. Said apex is therefore no longer capable of cutting the fibers correctly and the cutting-tool will score the fibers at the points $B_1$ and $B_2$ located on the line 102 and at a distance from the dents of the apex A.

FIG. 6 is a sectional view of an optical fiber which has been scored by the unit of FIG. 4, said unit being fitted with the cutting-tool of FIG. 5. The optical fiber is constituted by its cylindrical core $F_2$ surrounded by the cylindrical cladding $F_1$ which is concentric with the core $F_2$. The diameter D of the fiber is approximately 120 $\mu$m. The circumference 103 of the fiber F and of the cladding $F_1$ has two notches $C_1$ and $C_2$ which are symmetrical with respect to the vertical diameter of the fiber. The depth of the notches $C_1$ and $C_2$ is not uniform since it is dependent on the point resistance of the cladding $F_1$ but their maximum depth d is less than 5 $\mu$m.

The two notches $C_1$ and $C_2$ correspond to the passage of the two points $B_1$ and $B_2$ of the cutting-tool 10.

When the cutting-tool 10 of FIG. 5 is displaced by the unit according to the invention, the working point $B_2$ comes into contact with the fiber F. Under the action of the flexible strip 30 and of the resistance of the fiber F, the cutting-tool 10 then follows the circumference 103 of the cladding F1 and forms the notch $C_1$.

When the point $B_2$ of the line 102 is tangential to the circumference 103, the cutting-tool moves out of the fiber F and continues its travel along the circumference 103 without scoring this latter until the point $B_1$ is tangential to the circumference 103. The point $B_1$ of the cutting-tool 10 then forms the notch $C_2$ until the cutting-tool 10 moves clear of the fiber. The locations of the notches $C_1$ and $C_2$ do not play any part since the depth of these latter will be less than 5 $\mu$m by virtue of the flexible strip 30. The height adjustment of the tool unit consequently permits a certain tolerance of the order of 30 $\mu$m.

What is claimed is:

1. A tool unit for the collective breaking of optical fibers comprising:
   first means defining a reference plane and a direction of translational motion parallel to the reference plane;
   second means defining a straight bearing line for supporting the optical fibers at the apex of a convex surface, the straight bearing line being parallel to the direction of translational motion;
   third means for placing a cutting-tool above the reference plane while permitting translational movement of said tool along a straight line parallel to the bearing line so that the cutting portion of the tool is consequently capable of scoring all the fibers which are located on the straight bearing line; wherein
   said first means includes a platform rigidly fixed to a translational-motion guide strip having one face parallel to said translational-motion line; wherein
   said second means includes at least one clamping means for clamping the fibers in a plane containing the bearing line; and wherein
   said third means includes a cutting-tool support means for supporting said cutting tool and for permitting sliding movement thereof along said guide strip, and fine adjustment means for establishing the optimum height of the cutting-tool above said reference plane.

2. A tool unit according to claim 1, wherein the clamping means includes a preparation member from which the optical fibers emerge in parallel relation to each other, and a vise, said preparation member and said vise being located on each side of a cylinder whose top portion contains the straight bearing line on which the optical fibers are supported.

3. A tool unit according to claim 1, wherein the cutting-tool support means includes a first part forming a shoe slidably mounted on the platform along the translational-motion guide strip and a second part for supporting the cutting-tool, said second part being capable of moving towards and away from said first part.

4. A tool unit according to claim 3, wherein the first part of the cutting-tool support means columns located at right angles to the reference plane and adapted to penetrate into the second part of said support in such a manner as to ensure that said second part is capable of displacement in sliding motion along the columns under the action of a differential screw.

5. A tool unit according to claim 3, wherein the second part of the support means is provided with adjusting screws for orienting the cutting edge of the cutting-tool.

6. A tool unit according to claim 1, wherein said cutting tool support means includes means defining one face resting upon said platform and means defining another face slidable along said guide strip.

7. A tool unit according to claim 1, wherein the cutting-tool support means includes a body portion and spring means for connecting a split block which supports the cutting-tool to said body portion.

8. A tool unit according to claim 7, wherein the cutting-tool support means further includes adjusting screw means for displacing the split block with respect to the body portion of said support means.

9. A tool unit according to claim 7 or claim 8, wherein said spring means is a flexible strip.

10. A tool unit according to claim 1, wherein the cutting-tool support means includes means defining a vertical cylindrical bore within which the cutting-tool is movable.

11. A tool unit according to claim 1 wherein the cutting portion of said cutting tool has the shape of a convex curve.

12. A tool unit according to claim 11, wherein the cutting portion of the cutting-tool has a radius of curvature within the range of 1 mm to 30 mm in a plane perpendicular to the axis of the fibers.

* * * * *